(12) United States Patent
Chang et al.

(10) Patent No.: US 6,932,855 B2
(45) Date of Patent: Aug. 23, 2005

(54) METHOD FOR RECYCLING METALS FROM SWARF

(75) Inventors: James I. Chang, Kaohsiung (TW); Neng-Hsin Chiu, Kaohsiung (TW); You-Ming Jang, Kaohsiung (TW); Chun-Chi Lin, Chiai (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 0 days.

(21) Appl. No.: 10/690,702

(22) Filed: Oct. 23, 2003

(65) Prior Publication Data

US 2005/0087040 A1 Apr. 28, 2005

(51) Int. Cl.⁷ ............................................... C22B 1/00
(52) U.S. Cl. ................. 75/711; 75/715; 134/2
(58) Field of Search ................. 75/711, 715; 134/2

(56) References Cited

U.S. PATENT DOCUMENTS 3,997,359 A * 12/1976 Dankoff et al. ............... 134/10
2004/0152614 A1 * 8/2004 Hatch et al. ................. 510/421

* cited by examiner

Primary Examiner—Melvyn Andrews
(74) Attorney, Agent, or Firm—Rosenberg, Klein & Lee

(57) ABSTRACT

A method for recycling metals from swarf includes steps of removing oil in swarf by means of surfactant having a feature of strong hydrophilicity. The steps involves repeated stirring and washing, separating solid from liquid, and separating oil from water so as to force oil separate from the surface of solid, finishing all the steps in 10–30 minutes. Metals after finished the treatment may have only 1% of oil remained thereon, possible to be reused in metalworking. Oil and washing solution are also reusable after treated, so the method is effective both for treating waste and for recycling resources.

9 Claims, 1 Drawing Sheet n = 8-9
m = 7-12 n = 11-15
m = 7-12

METHOD FOR RECYCLING METALS FROM SWARF

BACKGROUND OF THE INVENTION

1. Field of the Invention

This invention relates to a method for recycling metals from swarf, particularly to one capable to separate oil in swarf by means of aqueous surfactant solution within thirty minutes with oil removing efficiency as high as more than 99%.

2. Description of the Prior Art

Grinding and cutting operation is a cutting process that removes material from the workpiece by the action of abrasive grains. It is the most important process in the metal working industry that manufacture high speed cutting tools, bearings, and special metal devices. In order to increase smoothness and lower temperature in grinding and cutting and enhance the surface quality of the workpiece cutting fluids is commonly used, resulting in swarf of metal mixed with cutting fluids.

As the metalworking industry has been growing year and year, swarf produced has been increased substantially, and some sward may contain chlorinated compounds and heavy metals belonging to harmful toxic waste, and its treatment has been looming up as a serious problem.

For example, metalworking industry in South Carolina State in USA, swarf produced every year surpasses 3 million tons, and that produced in the whole world may be extremely enormous, directly threatening business of the metalworking industry. Swarf particles are 1–10$\mu$ in their diameter, having economic worth. After swarf is compressed and filtered dry, there are still 30–50% oil remaining in it, and it is very risky to directly dissolve owing to potential explosion, If it can be separated, recycled, its treatment problem can be solved, saving dispenses for treatment and recovering recyclable oil and metals, having function of waste treatment and resource recycle as well.

In Taiwan ten thousand tons of swarf is produced every year, and liable to increase year by year, with the expense for treating also increasing day-by-day, seriously affecting existence of the metalworking industry. As swarf contains 30–50% cutting oil, the oil is apt to catch fire during its transporting, and its treatment depends almost on dissolution or burial in the ground. If it is dissolved, metals can be recovered for recycle, but oil is impossible to be recovered and residue has to be disposed of. But any useful resource is impossible to be recovered in case of burying.

For the present, no commercialized washing art for swarf are available, and a method for recycling sward under study is performed by washing with aqueous surfactant and extraction with supercritical carbon dioxide ($SCCO_2$). Extraction with the Supercritical carbon dioxide needs the condition of an atmosphere larger than 78.0 and of the temperature of 31.1 degrees, and the pressure commonly used in handling is generally larger than 100 atmosphere, in addition to expensive equipment, so it is not so prevalent, The relative research disclosed that aqueous surfactant solution on the market is substantially effective in removing nonaqueous organic pollutants and oils from substances containing soil and sand, CFC-113 used recently as washing solution is limited in its effectiveness, so another washing method is now under research and development for some industry.

The step using the surfactant solution for washing swarf is very similar to the soil washing, involving mixing dry swarf (not yet treated swarf) with the surfactant solution, and producing two flow processes. One is for clean and wet swarf and the other for emulsifying oil solution. The former process is to separate metal powder from clean and wet swarf by means of a magnetic device. The latter process is to send the already separated metal powder to a steel factory for recycling and reuse. The large quantity of aqueous emulsion has to be treated and removed of the pollutant (the surfactant and the cutting oil) contained in it. In this washing art, it plays a critical role in the economy to recycle and reuse the surfactant, which is quite expensive.

Nowadays many commercial surfactants used in research in foreign countries are as follows.

SA-8 of Amway corporation, Dowfax of Dow Chemical Company, CDE/A6, CDE/A6, BQ6, AMT of Albright Wilson, AquaTek of Rhone-Poulenc, and Micro of International Products. Their oil removing efficiency is shown below, being between 86–98%, needing many times and 1–6 hours for washing. As there are disadvantages that a large quantity of washing solution is required, the time needed for washing is long, and the solution after washing cannot be reused, those surfactants have to be improved. In addition, they are rather priced high, so a cheaper surfactant is to be found to take place of them.

| Research Institute | South Carolina University, Chemical Eng. Dept. | South Carolina University Mineral Product Research Dept. |
|---|---|---|
| Wash time | 45 | 375 |
| Wash efficiency | 86.0 | 98.1 |

SUMAMRY OF THE INVENTION

The first objective of the invention is to offer a method for recycling metals from swarf, which can remove quickly more than 99% of oil contained in swarf produced during grinding and cutting process in metalworking industry, and the swarf after treated does not only naturally catch fire, but also can be recycled for reuse, thus reducing largely the quantity of waste produced and to be treated.

A second objective of the invention is to offer a method for recycling metals from swarf, which can treat swarf to contain less than 1% of oil to meet the regulation of recycling metal by dissolving so as to be recycled for reuse. The oil separated from swarf can be mixed with fuel or used as material for a waste oil-recycling device.

A third objective of the invention is to offer a method for recycling metals from swarf, which can lower largely the expense required for treating waste, possible to recycle useful metal and oil, increasing income, and having economic value.

A fourth objective of the invention is to offer a method for recycling metals from swarf, which utilizes aqueous surfactant for removing oil sticking on the surface of swarf, similar to the common washing process used in industry. Any worker in common industry may be able to use the method, and the washing solution repeatedly used for more than 10 times can be used for washing common machinery and the ground with only a small quantity of it necessary to be treated by a waste water treating accommodation.

A fifth objective of the invention is to offer a method for recycling metals from swarf, which can be used for removing oil sticking on the surface of any metal part, a broken piece, a thing, etc.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
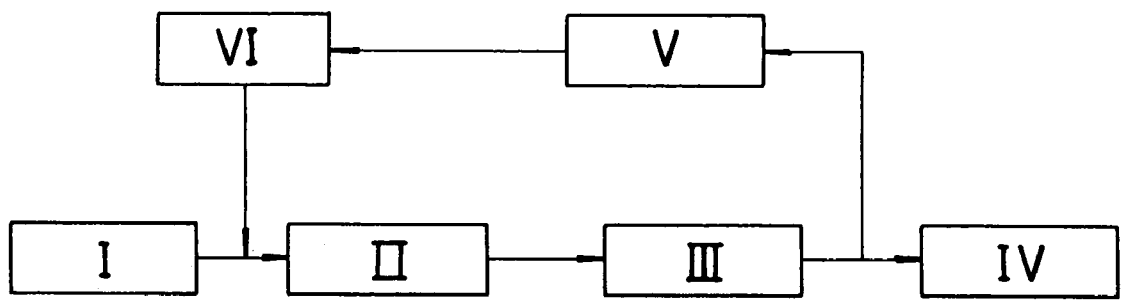
FIG. 1 is a flow chart of a method for recycling metals from swarf in the present invention.

A preferred embodiment of a method for recycling metals from swarf in the present invention, as shown in FIG. 1, includes steps of:

I. Shattering: shatter swarf:

II. Stirring and Washing: put swarf in a wash tank, and wash it with a wash solution:

III. Separating Solid From Liquid: separate solid from liquid after washing:

IV. Drying: dry solid substance:

V. Separating Oil From Water: collect the wash solution after washing and remove oil floating on the water off: and, VI. Collecting and Storing Wash Solution: collect the wash solution with oil removed and flowed back.

For details of the six steps just mentioned, they are described as follows.

I. Shattering

Cut metal particles are very tiny, having a diameter 1–10 $\mu$m, but cutting fluid sticks on the surface of the metal particles, forming a loose mass, so swarf has to be shattered at first.

II. Stirring and Washing

Swarf has to be washed after shattered, by using wash solution for washing off cutting oil sticking on the surface of metal particles. As the specific gravity of oil is lighter than the wash solution, the oil will float on the upper level of the wash solution, In order to promote the wash solution to contact and mix with swarf, the wash solution has to be stirred, and the rotating speed for stirring is preferably between 100 and 400 times per minute.

Besides, the ratio of the washing solution to the swarf is 5:1–15:1, and washing frequency is 2–5 times. with the washing time required being 1–3 minutes. After each round of washing the washing solution is poured in a separating device for separating oil from water. After the last washing, the washing solution and the metal particle mass are together poured in a solid-liquid separating device.

III. Separation of Solid from Liquid

Solid metal mass and washing solution have to pass through the separating process after finished washing, and the washing solution after separated is to be flowed back for reuse.

IV. Drying

Solid metal mass separated from the washing solution is dried completely and sent to a metal recycling device or accommodation for reusing the metal recycled.

V. Separation of Oil from Water

The washing solution still containing oil after washing receives the process of separating so as to let the oil in the washing solution removed from the upper level of the washing solution, and then sent to a storing tank for storing or to an oil recycling unit for recycled.

VI. Treating and Storing of Washing Solution

Figure 2:
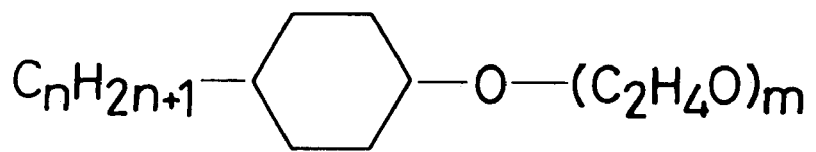
FIG. 2 is a chemical formula of the molecule of surfactant of polyethoxylated nonyl ether and polyethoxylated octyl-phenyl ether used in the present invention; and, FIG. 3 is a chemical formula of the molecule of surfactant of polyethoxylated alkyl ether used in the present invention.
Figure 3:
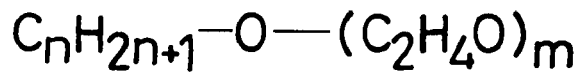

Washing solution is constituted of aqueous alkali non-ionic surfactant and builders mixed in water, capable to let oil separate from the surface of cutting debris and chips to enter the water solution. The aqueous non-ionic surfactant is mainly composed of polyethoxylated alkyl involving polyethoxylated octyl-phenyl ether, polyethoxylated nonyl-phenyl ether or polyethoxylated alkyl ether, or the mixer of the two or the three of those. The chemical molecule formula of polyethoxylated nonyl-phenyl (n=9) and polyethoxylated octyl-phenyl ether (n=8) is shown in FIG. 2, involving hydrophobic octyl phenol, nonyl phenol and hydrophilic polyethoxylene. Every mole of nonyl phenol contains 7–12 ethoxylene molecule. The chemical molecule formula of polyethoxylated alkyl ether is shown in FIG. 3, involving hydrophobic alkyl ether, octyl phenol and hydrophilic polyethoxylene. The carbon in alkyl is 11–15. Every mole of alkyl phenol contains 7–12 ethoxylene molecule. The weight of the surfactant in the washing solution is 50 g–200 g. The builders in the washing solution contained in the washing solution are composed of sodium silicate, sodium tripolyphosphate (STPP) and sodium carbonate. The weight of sodium silicate is 5 g–50 g, and that of sodium tripolyphosphate (STPP) 1 g–10 g, and that of sodium carbonate 1 g–50 g. The pH value of the washing solution is 10.5–11.5, and the temperature of the washing solution is 45–60° C.

The method for treating swarf in the invention uses washing solution concocted of aqueous alkali nonion surfactant, builders and water for removing oil sticking on the surface of swarf, possible to transform waste into recyclable metals and cutting fluid, attaining more than 99% efficiency. At the same time, its washing process is quite similar to the traditional process of shattering, stirring and washing, separating solid from liquid, separating oil from water, and a machine needed is simple in the structure and low-cost, available in the domestic market. In case the method can be promoted widely, the problem of disposing metal swarf can be solved, and in addition, usable metals and oil are also recycled for reuse. The washing solution can be repeatedly used for more than 10 times, and the quantity of oil only accounts for 0.2% of the total solution, usable for factories and machines, breaking through the past problem of how to treat metal swarf. Moreover, the time required in the process of removing oil only needs as short as 10–30 minutes to lower the oil contained in swarf to as low as 1%, compared with the time needed in the study made in foreign countries being 1–6 hours, with its efficiency of oil removing being lower than the present invention, and with its oil not used repeatedly. Aside from the advantages mentioned just above, the equipment required in the invention is simple in its structure, easy to make, adjustable according to the volume of swarf produced by a factory itself. The size of the equipment may be quite small, only occupying a small site, extremely suitable for metalworking industry in Taiwan.

The method according to the present invention has the following advantages, as can be understood from the aforesaid description.

1. It uses a washing solution concocted with aqueous alkali non-ionic surfactant, builders and water for removing oil sticking on the surface of swarf in 10–30 minutes, transforming waste into recyclable metals and cutting oil, and attaining more than 99% efficiency.

2. It uses processes quite similar to the transitional processes of shattering, stirring and washing, separating solid from liquid, separating oil from water, requiring simple structured machines of low cost and available domestically.

3. The washing solution can be repeatedly used more than 10 times, containing oil volume only 0.2% of the total solution, usable for a factory or washing machines.

4. The equipment needed is simple and easy to make, adjustable according to the swarf quantity produced by a factory, and the size of the equipment may be very small, occupying only a small dimensions, extremely suitable to metalworking industry in Taiwan.

While the preferred embodiment of the invention has been described above, it will be recognized and understood that various modifications may be made therein and the appended claims are intended to cover all such modifications that may fall within the spirit and scope of the invention.

What is claimed is:

1. A method for recycling metals from swarf comprising the steps of:
   (1) providing a plurality of particles of said swarf having an oil adhering to said swarf as a surface layer;
   (2) shattering said swarf to have a particulate size ranging from 1 micron to 10 microns;
   (3) washing said swarf at least once in a washing tank by combining said swarf with an alkaline washing solution having a pH ranging from 10.5 to 11.5 to provide a mixture of swarf and said alkaline washing solution, said alkaline washing solution comprising:
      (a) an aqueous alkali non-ionic surfactant that further comprises:
         at least one polyethoxylated alkyl ether containing at least one hydrophobic alkyl ether chosen from the group of alkyl ethers having the formula $C_nH_{2n+1}(C_6H_4)(C_2H_4O)_m$ where n is an integer chosen from the group consisting of 8 and 9, and m is another integer from 7 to 12, as well as
         at least one hydrophilic alkyl ether chosen from the group of alkyl ethers having the formula $(C_nH_{2n+1})O(C_2H_4O)_m$ where n is an integer from 11 to 15 and m is another integer from 7 to 12;
      (b) at least one builder species chosen from the group consisting of sodium silicate, sodium tripolyphosphate and sodium carbonate and combinations thereof; and,
      (c) a predetermined amount of water, said aqueous alkali non-ionic surfactant further comprising at least one polyethoxylated alkyl species;
   (4) separating a washed solid from said mixture of swarf and said alkaline washing solution to yield a substantially particulate-free washing solution, said washed solid comprising at least one reclaimable metal for recycling;
   (5) drying said washed solid and removing said dried washed solid for recycling;
   (6) separating said oil from the substantially particulate-free washing solution by removing the oil floating above an aqueous phase of the alkaline washing solution to yield a substantially oil-free substantially particulate-free washing solution; and,
   (7) storing said substantially oil-free substantially particulate-free washing solution.

2. The invention in accordance with claim 1, wherein said builders in said alkaline washing solution are present with a concentration of sodium carbonate ranging from about 1 gram per liter to about 50 grams per liter.

3. The invention in accordance with claim 1, wherein the aqueous alkali non-ionic surfactant in said alkaline washing solution comprises a plurality of polyethoxylated alkyl ethers including a polyethoxylene.

4. The invention in accordance with claim 3, wherein said hydrophilic polyethoxylene comprises said ethylene oxide in a range of about 9 moles to about 14 moles.

5. The invention in accordance with claim 3, wherein said hydrophobic alkyl ethers contain a methyl group and a methylene group in the range of about 10 moles to about 14 moles.

6. The invention in accordance with claim 1, wherein said alkaline washing solution contains a concentration of said aqueous alkali non-ionic surfactant of about 50 grams per liter to about 200 grams per liter.

7. The invention in accordance with claim 1, wherein said builder species in said alkaline washing solution are present as a concentration of sodium silicate ranging from about 5 grams per liter to about to 50 grams per liter.

8. The invention in accordance with claim 1, wherein said builder species in of said alkaline washing solution are present with a concentration of sodium tripolyphosphate ranging from about 1 gram per liter to about 10 grams per liter.

9. The invention in accordance with claim 1, wherein said aqueous non-ionic surfactant solution is preheated to a predetermined temperature ranging from about 45 degrees Celsius to about 60 degrees Celsius before said step 3.

* * * * *